United States Patent
Morikawa

(10) Patent No.: US 6,955,533 B2
(45) Date of Patent: Oct. 18, 2005

(54) APPARATUS AND METHOD FOR EXTENDING FOOD DOUGH

(75) Inventor: Michio Morikawa, Utsunomiya (JP)

(73) Assignee: Rheon Automatic Machinery Co., Ltd., Tochigi (JP)

( * ) Notice: Subject to any disclaimer, the term of this patent is extended or adjusted under 35 U.S.C. 154(b) by 132 days.

(21) Appl. No.: 10/073,932

(22) Filed: Feb. 14, 2002

(65) Prior Publication Data

US 2002/0110611 A1 Aug. 15, 2002

(30) Foreign Application Priority Data

| Feb. 15, 2001 | (JP) | ............................. 2001-039041 |
| Jan. 7, 2002 | (JP) | ............................. 2002-000860 |
| Feb. 5, 2002 | (JP) | ............................. 2002-028681 |

(51) Int. Cl.[7] .............................................. A21C 3/02
(52) U.S. Cl. ...................... 425/193; 425/355; 425/365; 425/367; 425/373
(58) Field of Search ............................... 425/355, 365, 425/366, 367, 373, 193, 502, 504, 101, 450.1

(56) References Cited

U.S. PATENT DOCUMENTS

| 4,260,578 A | * | 4/1981 | Moody ....................... 264/40.7 |
| 4,631,017 A | * | 12/1986 | Hayashi ....................... 425/335 |
| 4,880,375 A | * | 11/1989 | Hayashi ....................... 425/335 |
| 5,151,024 A | * | 9/1992 | Hayashi ....................... 425/141 |
| 5,496,578 A | * | 3/1996 | Muller et al. ................ 426/502 |
| 5,783,218 A | * | 7/1998 | Morikawa .................... 425/101 |
| 5,862,743 A | * | 1/1999 | Cimenti ..................... 99/450.2 |
| 6,257,861 B1 | | 7/2001 | Morikawa .................... 425/363 |

FOREIGN PATENT DOCUMENTS

| EP | 0 128 015 | 12/1984 |
| EP | 0 953 287 A2 | 11/1999 |
| JP | 60-52769 | 11/1985 |
| JP | 09-84508 | 3/1997 |
| JP | 11-308961 | 11/1999 |

* cited by examiner

Primary Examiner—Robert Davis
Assistant Examiner—Emmanuel S. Luk
(74) Attorney, Agent, or Firm—Finnegan, Henderson, Farabow, Garrett & Dunner, L.L.P.

(57) ABSTRACT

An apparatus for extending food dough is provided that is compact and has a relatively long conveying path for food dough that extends the food dough. Also, the apparatus can be easily cleaned and maintained. It includes a lower frame (3) having a food-conveying member to convey food dough in one direction, an upper frame (5) located above the lower frame, and a cluster of a plurality of extending rollers that are located within the upper frame. To extend the food dough the extending rollers are arranged to be endless and rotatable. The upper frame (5) can be moved up and down in relation to the lower frame (3) so that the cluster of the plurality of the extending rollers can be completely separated from the food-conveying member. Thus, the food-conveying member can be easily cleaned.

6 Claims, 3 Drawing Sheets

APPARATUS AND METHOD FOR EXTENDING FOOD DOUGH

TECHNICAL FIELD

This invention relates to an apparatus for extending food dough, such as confectionery dough, bread dough, or other dough, to be sheet-like. Particularly, it relates to an apparatus for extending food dough to be sheet-like wherein the apparatus is compact and can be easily cleaned and maintained.

BACKGROUND OF INVENTION

Japanese Patent Laid-open Publication No. 11-308961 (prior-art publication 1) and Japanese Patent Publication No. 60-52769 (prior-art publication 2) disclose some prior-art apparatuses.

Prior-art publication 1 discloses an apparatus having a cluster of a plurality of extending rollers. The cluster is located above an apparatus for conveying food dough in one direction. The rollers are arranged in a circle, and rotate along the circle. In that apparatus the distance between the cluster of the extending rollers and the apparatus for conveying food dough is set at a given length. Thus, it is difficult to maintain or check the cluster of the extending rollers and the food-conveying apparatus. Also, there is a problem in that the length along which the food dough is extended by the cluster of the extending rollers is short.

Prior-art publication 2 discloses another apparatus having a cluster of a plurality of extending rollers. The cluster is located above an apparatus for conveying food dough in one direction. The rollers are arranged in an ellipse, and rotate along the ellipse. In that apparatus the cluster can be moved up and down to change the thickness of food dough. Thus, the distance between the cluster of the extending rollers and the apparatus for conveying food dough can be changed within a range corresponding to the variation in the thickness of the food dough. Thus, that apparatus has the same problems as referred to for prior-art publication 1.

SUMMARY OF INVENTION

To overcome the disadvantages discussed above this invention was conceived. According to the first concept of this invention, an apparatus for extending food dough is provided. It comprises a lower frame having a food-conveying member to convey food dough in one direction, an upper frame located above the lower frame, and a cluster of a plurality of extending rollers that are located within the upper frame. The extending rollers are arranged to be endless and rotatable, to extend the food dough. The upper frame can move up and down in relation to the lower frame to move the cluster of the plurality of the extending rollers far from the food-conveying member, so that the food-conveying member can be cleaned.

A feeding-in conveyor can be located on the food-conveying member to supply food dough between the cluster of the extending rollers and the food-conveying member. A part of the feeding-in conveyor is guided by a belt-guiding member that is inclined so that the downstream end of the feeding-in conveyor is lower. This part corresponds to the cluster of the extending rollers.

A feeding-out conveyor may be located on the food-conveying member to convey downstream the food dough that is extended. A part of the feeding-out conveyor is guided by a belt-guiding member that is inclined so that the downstream end of the feeding-out conveyor is higher. This part corresponds to the cluster of the extending rollers.

The food-conveying member may be provided with a feeding-in conveyor to feed in food dough and a feeding-out conveyor to feed out food dough. Belt-guiding members are located to guide parts of the feeding-in and feeding out conveyors so that the parts are inclined. The parts correspond to the cluster of the extending rollers. The first and second conveying rollers are located between the belt-guiding members so that the first and second conveying rollers correspond to the cluster of the extending rollers. The distance between the first conveying roller and the cluster of the extending rollers is less than that between the inclined part of the feeding-in conveyor and the cluster of the extending rollers. The distance between the second conveying roller and the cluster of the extending rollers is less than that between the first conveying roller and the cluster of the extending rollers. Also, the distance between the inclined part of the feeding-out conveyor and the cluster of the extending rollers is less than that between the second conveying roller and the cluster of the extending rollers.

According to the second concept of this invention, another apparatus for extending food dough has been conceived. It includes a frame having a food-conveying member to convey food dough in one direction and a cluster of a plurality of extending rollers that are located within the frame. The extending rollers are arranged to be endless and are rotatable to extend the food dough. The apparatus also includes a feeding-in conveyor located to supply food dough between the cluster of the extending rollers and the food-conveying member. A part of said feeding-in conveyor is guided by a belt-guiding member to be inclined so that the downstream of that part is lower. That part corresponds to the cluster of the extending rollers.

A feeding-out conveyor is provided for the food-feeding member to convey downstream food dough that is extended. The feeding-out conveyor is guided by an inclined belt-guide so that the part of the downstream part of the feeding-out conveyor that corresponds to the cluster of the extending rollers is lower.

The food-conveying member is provided with a feeding-in conveyor to feed in food dough and a feeding-out conveyor to feed out food dough. Belt-guiding members are located to guide parts of the feeding-in and feeding-out conveyors so that those parts are inclined. Those parts correspond to the cluster of the extending rollers. The first and second conveying rollers are located between the belt-guiding members so that the first and second conveying rollers correspond to the cluster of the extending rollers. The distance between the first conveying roller and the cluster of the extending rollers is less than that between the inclined part of the feeding-in conveyor and the cluster of the extending rollers. The distance between the second conveying roller and the cluster of the extending rollers is less than that between the first conveying roller and the cluster of the extending rollers. Also, the distance between the inclined part of the feeding-out conveyor and the cluster of the extending rollers is less than that between the second conveying roller and the cluster of the extending rollers.

BRIEF EXPLANATIONS OF DRAWINGS

PREFERRED EMBODIMENT OF THIS INVENTION

Figure 1:
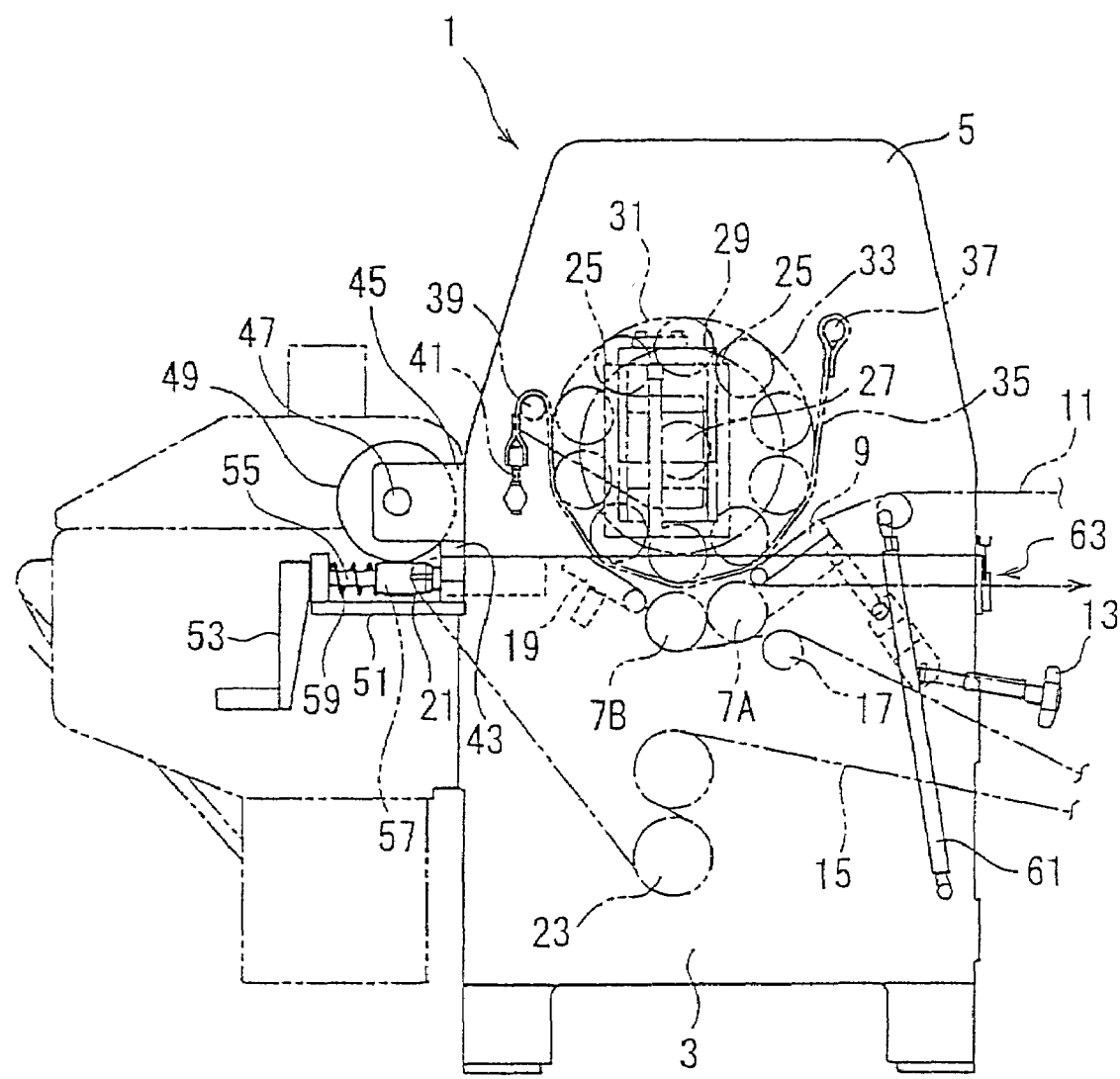
FIG. 1 is a side view of the apparatus for conveying food dough of this invention, where the upper frame is closed.

FIG. 1 shows an embodiment of an apparatus 1 for extending food dough of this invention. It includes a lower frame 3 and an upper frame 5. Within the lower frame 3 an apparatus for conveying food dough, such as confectionery dough, bread dough, or other dough (not shown), in a specific direction (in FIG. 1 from right to left) is located. Prior-art apparatuses may be used for that apparatus. An embodiment of the apparatus of this invention is constructed as follows:

Rotatable conveying rollers 7A, 7B are located, as an embodiment of the conveying apparatus for food dough, near the upper center part of the lower frame 3. In FIG. 1 the conveying rollers 7A, 7B are rotated counterclockwise by a control motor (not shown). The conveying roller 7A is positioned upstream of the conveying path of the food dough. Also, it is located at a position slightly higher than that of the conveying roller 7B, which is positioned downstream.

Upstream of the conveying roller 7A a belt-guiding member 9 is located. It is inclined so that its downstream side is lower than its upstream side. The angle of the inclination can be changed. A conveyor belt 11 is put on the belt-guiding member 9 to carry in food dough. The angle of inclination of the belt-guiding member 9 can be adjusted by operating a knob 13, which is put on the lower frame 3.

A feeding-out conveyor 15 is located within the lower frame 3 to carry out food dough from the conveying rollers 7A, 7B. The conveyer 15 passes over a guide roller 17 and the conveying roller 7B and is then guided by a belt-guiding member 19. The belt-guiding member 19 is positioned downstream of the guide roller 17 and the conveying roller 7B. Also, the belt-guiding member 19 is inclined so that its downstream end is higher than its upstream end. Thus, the conveyor 15 contacts the lower surfaces of the conveying rollers 7A, 7B and is put on a plurality of the guide rollers 21 and a driving roller. Also, a conveyor 15 supplies flour that is supplied by a flour-supplying apparatus (not shown) to the conveying rollers 7A, 7B. The conveying rollers 7A, 7B and the belt-guiding member 9, which is positioned upstream of the conveying path, and the belt-guiding member 19, which is positioned downstream of the conveying path, are arranged in an arc. The conveying rollers 7A, 7B are positioned lower.

Within the upper frame 5 a cluster of a plurality of extending rollers is located. The rollers are arranged to be endless. With the food-dough conveying apparatus they can be rotated to extend the food dough. The upper frame 5 is a box that has an opening at the bottom. Vertical guide members 25 are located on the inner surfaces of the left and right side frames (that are positioned at the sides of the upper frame in a direction perpendicular to the plane of FIG. 1) of the upper frame. Sliders 29 are supported by the guide members 25. The sliders 29 rotatably support the ends of a rotating shaft 27. The sliders 29 are guided by the guide members 25 so that the positions of the sliders can be adjusted.

The rotating shaft 27 can be rotated by a controlling motor (not shown) that is fixed on the upper frame 5. At the sides of the ends of the rotating shaft 27, opposed members 31 for supporting the rollers are fixed. The members 31 are disc-like. The ends of the plurality of the extending rollers 33 are supported by and between the roller-supporting members 31. The rollers 33 can rotate about their axes. They are used to extend the food dough. The plurality of the extending rollers 33 are positioned in a circle at equal intervals, so that they are arranged to be endless. The extending rollers 33, the conveying rollers 7A, 7B, and belt-guiding members 9, 19 are arranged in an arc corresponding to the arc of the circle formed by the rollers 33.

When the rotating shaft 27 rotates clockwise in FIG. 1, the extending rollers 33 revolve. Belts 35 are arranged near the side frames of the upper frame 5. The belts 35 are extended by tensioning members 41, such as a spring, and pins 37, 39. The belts contact the rollers near their ends when they pass along the concave position formed by the conveying rollers 7A, 7B and the guiding members 9, 19. Thus, each roller 33 can rotate at the concave position when it revolves.

Thus, in FIG. 1 when the rotating shaft 27 is rotated clockwise to revolve the extending rollers 33, each roller 33 rotates when it contacts the belt 35 at the position corresponding to the concave position. The speeds of the carrying-in conveyor 11, the conveying rollers 7A, 7B, and the carrying-out conveyor 15 can be appropriately set. When the speed of the conveyor 15 is higher than the speeds of the conveyor 11 and the rollers 7A, 7B, and when the speeds of the rollers 7A, 7B are higher than the speed of the conveyor 11, the effect of the extension of the food dough by them can be increased. Also, the speeds of the conveyor 11, the rollers 7A, 7B, and the conveyor 15 may be made progressively lower, in that order. Also, the speed of the roller 7B may be the same as that of the conveyor 15, while the speed of the roller 7A may be the same as that of the conveyor 11. The speeds of them can be selected based on the variations of the distances between the food-dough conveying apparatus and the cluster of the extending rollers.

Figure 2:
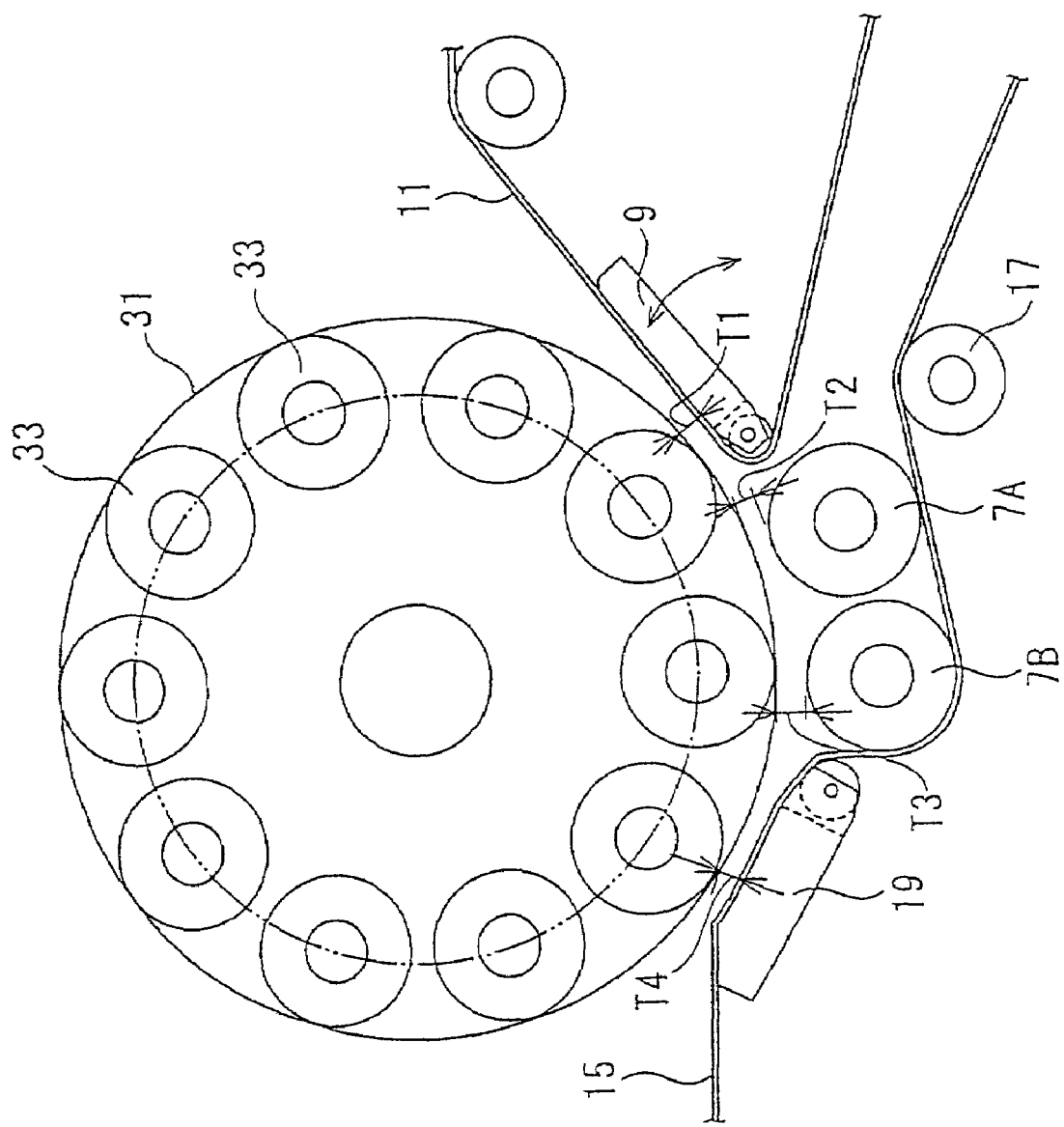
FIG. 2 is an expanded view of the main part of the apparatus in FIG. 1.

In detail, as in FIG. 2, the part of the conveyor 11 over which the cluster of the extending rollers passes is guided by the guide member 9. That part is inclined so that its downstream side is lower. Also, the distance between the cluster of the extending rollers and the inclined part of the conveyor 11 is gradually narrowed in the direction downstream of the feeding path. Also, the part of the conveyor 15, on which the cluster of the extending rollers passes, is guided by the guide member 19. That part is inclined so that its downstream part is higher.

If the speeds of the feeding-in conveyor 11, the first and second conveying rollers 7A, 7B, and the feeding-out conveyor 15 are set to be V1, V2, V3, and V4, respectively, the relation between them may be set to be V1<V2<V3<V4. However, if V1 is lower than V4, the speeds V1 and V2 of the feeding-in conveyor 11 and the first conveying roller 7A may be the same. Also, the speeds V3 and V4 of the feeding-out conveyor 15 and the second conveying roller 7B may be the same. Thus, their relation can be set to be V1<V4, V1=V2, and V3=V4. Their relation may be set to be V1<V2<V4 and V2=V3. Also, their relation may be set to be V1<V4 and V1=V2=V3 or V2=V3=V4.

When the roller-supporting member 31 for the cluster of the extending rollers rotates, the outer surfaces of the extending rollers 33 trace a circular trajectory. The distances between the circular trajectory and the surfaces of the feeding-in conveyor 11, the first and second conveying rollers 7A, 7B, and the feeding-out conveyor 15 are set to be T1, T2, T3, and T4. The relation between them is T1>T2>T3>T4.

The parts of the conveyors 11 and 15 that run near the rollers of the cluster are inclined by being guided by the belt-guiding members 9 and 19. The first and second extending rollers 7A, 7B are put between the belt-guiding members 9 and 19. Thus, the path for extending food dough is formed between the cluster of the extending rollers, the conveyors 11 and 15, and the belt-guiding members 9, 19. Thus, the path is shaped to be a concave along and under the arc of the cluster, so that the path can be relatively long.

Thus, the path where food dough is extended is shaped as an arc along the circular trajectory of the rotating cluster, so that the apparatus can be compact. Also, that path can be elongated. Thus, a good extension of the food dough can be achieved.

The sliders 29 are moved up and down to adjust the distances between the surfaces of the conveying rollers 7A, 7B and the rollers 33 corresponding to those rollers. Then, food dough is supplied from the feeding-in conveyor 11 and sent in the left direction, in FIG. 1. Simultaneously the conveying rollers 7A, 7B and the feeding-out conveyor 15 are operated. Also, the rotating shaft 27 is rotated. Thus, the feeding path is formed between the plurality of the extending rollers 33 and the parts of the conveyors 11 and 15 that are guided by the belt-guiding members 9 and 19 and the conveying rollers 7A, 7B. Food dough can be extended on the path. The extended food dough is fed by the feeding-out conveyor 15 to a subsequent apparatus.

Thus, food dough is conveyed along the path on the feeding-conveyor 11, the conveying rollers 7A, 7B, and the feeding-out conveyor 15, while the rollers 33 are revolved at a high speed. Thus, the revolutions of the rollers vibrate the food dough and allow it to be extended to be a sheet.

When the operation extending the food dough is completed, the upper frame 5 can be moved up to be open in relation to the lower frame 3, so that the conveying rollers 7A, 7B and the extending rollers, etc., can be readily cleaned. Then the upper frame 5 can be moved down to be closed.

A bearing bracket 43 is located on the rear side (left side in FIGS. 1 and 3) of the lower frame 3 at its upper part. A bracket 45 is located on the rear side of the upper frame 5 at its lower part. The bracket 45 is supported by the bearing bracket 43 through a supporting shaft 47, to which a worm wheel 49 is integrally connected. The bracket can be rotated up and down.

To rotate the worm wheel 49, a handle bracket 51 is located on the rear side of the lower frame 3. A rotating shaft 55 is rotatably supported by the handle bracket 51 and the bearing bracket 43. A handle 53 is fixed on the end of the rotating shaft 55. A worm gear 57 is fixed on the rotating shaft 55. The worm gear 57 meshes with the worm wheel 49. The rotating shaft 55 may be a spline shaft, etc. It supports the worm gear 57 so that the worm gear 57 can be moved along the axis of the shaft 55. Also, the shaft 55 and the worm gear 57 can be rotated integrally. A spring member, such as a coil spring, is located between the worm gear 57 and the handle bracket 51 to always press the worm gear 57 against the bearing bracket 43.

Figure 3:
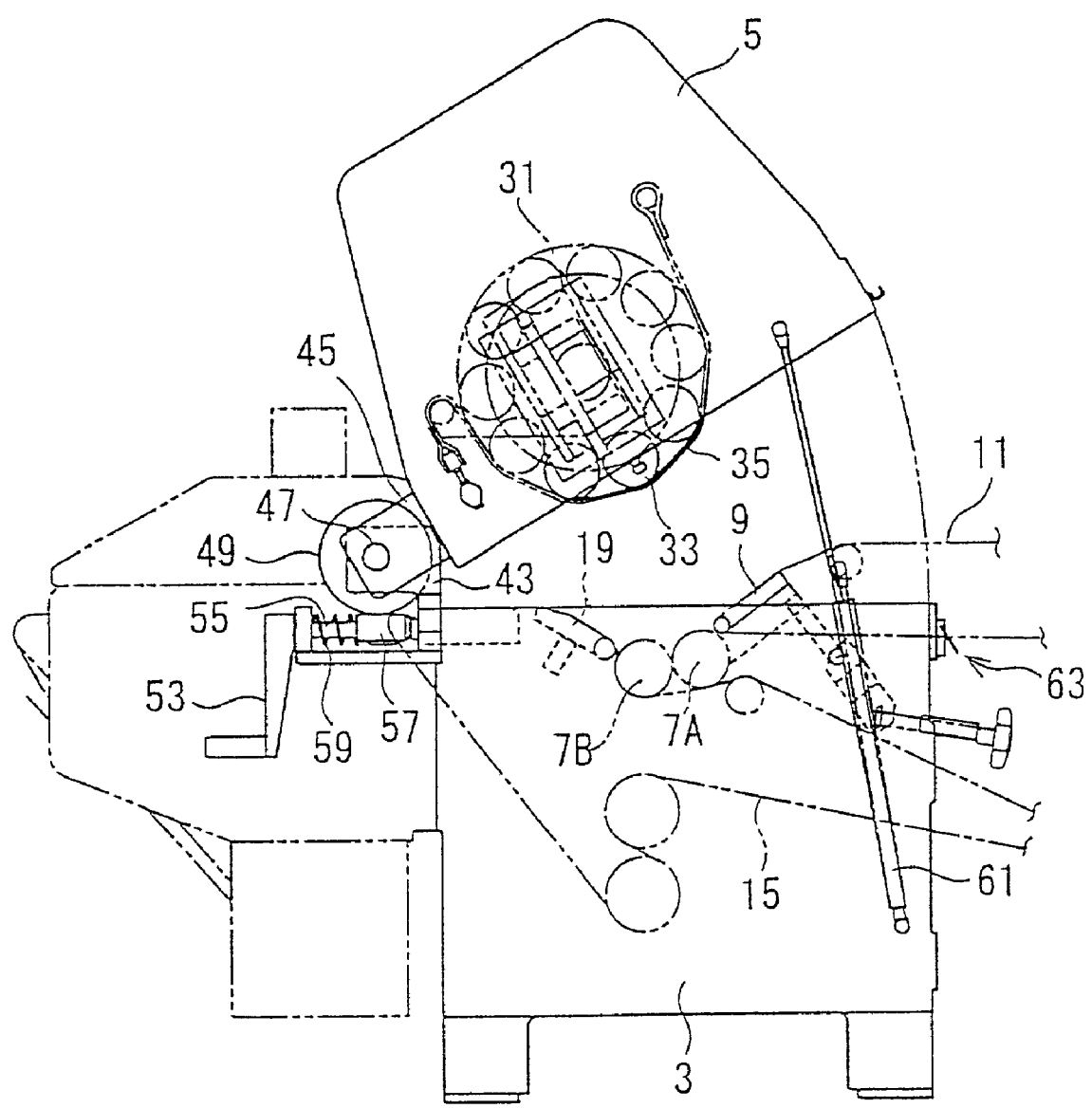
FIG. 3 is a side view of the apparatus for conveying food dough of this invention, where the upper frame is open.

Thus, when the worm gear 57 is rotated by the handle 53, and the worm wheel 49, which meshes with the worm gear 57, is rotated, the upper frame 5 is rotated so that the front of it (the right side in FIGS. 1 and 3) is moved upward, such as from the condition in FIG. 1 to the condition in FIG. 3.

An energizing member 61 is located between the lower and upper frames 3 and 5, so that the handle 53 can be easily operated while the upper frame 5 is moved upward. Also, a locking member 63 is located on the lower frame 3 so that the upper frame 5 can be prevented from being suddenly moved up. The energizing member 61 may be comprised of a member, such as a gas spring, etc., that can be extended and that can move the upper frame 5 upward against its weight. This type of member is known. Thus, no details on this member are given. Also, the locking member 63 may be a known member that is used to prevent a top from being opened. Thus, no details on this member are given.

So as to move upward the front side of the upper frame 5, first, the lock of the rocking member 63 is released. Then, the handle 53 is rotated. In that case the handle can be easily rotated because the energizing member 61 helps the upper frame 5 move upward.

As referred to above, when the upper frame 5 is moved upward, the space above the conveying rollers 7A, 7B is opened sufficiently. Thus, the rollers 7A, 7B, etc., can be easily cleaned and checked. Also, the extending rollers 33, etc., can be easily cleaned and maintained, because the upper frame 5 is inclined so that its front is moved upward to make a wide space between the upper and lower frames at the front and sides.

After the conveying rollers 7A, 7B and the extending rollers 33, etc., are cleaned, the upper frame 5 is moved downward to be returned to its original position. To return the upper frame 5, the handle 53 is reversely rotated. Also, the upper frame 5 can be closed by its front being forcedly pressed. In that case, as the upper frame is moved downward, the worm wheel 49 is rotated clockwise (in FIG. 3). In relation to this rotation of the worm wheel 49, the worm gear 57 is moved to the left side in FIG. 3 against the pressure of the energizing member 59. Then, when the handle 53 is again operated to move upward the upper frame 5, first the worm gear 57 is rotated in relation to the worm wheel 49 and moved to abut the bracket 43. When the worm gear 57 abuts the bracket 43, the worm wheel 49 starts being rotated.

In the above discussion, the upper frame 5 is rotated to move its front upward in relation to the lower frame 3. However, the horizontal upper frame 5 may also be moved upward. Also, within the lower frame 3 the food-feeding member may be comprised of a plurality of belt conveyors that are horizontally and serially located. In that case, a cluster of a plurality of extending rollers is shaped as an ellipse. The rollers are positioned over the plurality of the extending rollers. It is desirable that in that case the upper frame be held in a horizontal plane so that it can be more fully moved upward and down than the case in which the front end of the upper frame is raised. Actuators that are comprised of fluid cylinders or ball screws, etc., may be located at the four corners of the lower frame to move the upper frame up and down. When the actuators are synchronously operated, the upper frame can be kept in a horizontal plane and be moved up and down.

Also, the worm wheel 49 and worm gear 57, etc., may be located on either the left or right side of each of the lower and upper frames 3 and 5, so that one of the sides of the upper frame 5 can move up and down around the hinge of the other side, to open the upper frame.

According to this invention, the upper frame is provided with the cluster of a plurality of the extending rollers, and the lower frame is provided with the food-feeding member. Also, the upper frame is located on the upper frame to be opened sufficiently in relation to the lower frame, so that the food-feeding member and the cluster of the extending rollers can be easily cleaned and maintained. Thus, the inside of the food-extending apparatus can be easily cleaned. Also, components of it that are located inside it can be easily maintained. The food-extending apparatus can be made compact. Also, the extending and feeding path of food dough can be extended by forming the path as an arc. Thus, this invention can overcome the disadvantages the prior-art apparatuses have.

What is claimed is:

1. An apparatus for extending food dough comprising
   a lower frame having a food-conveying member to convey food dough in one generally horizontal direction,
   a box-shaped cover mounted to and located above the lower frame that has an opening in a bottom thereof,
   a cluster of a plurality of extending rollers mounted in and to the box-shaped cover, said extending rollers being arranged to be endless and rotatable and in cooperation with the food-conveying member to extend food dough conveyed by the food-conveying member, and
   means for moving the box-shaped cover with the cluster of the plurality of extending rollers located therein in an up and down direction and toward and away from the lower frame and the food-conveying member located therein so that the box-shaped cover and the cluster of the plurality of extending rollers therein can be moved upwardly and away from the food-conveying member.

2. The apparatus of claim 1, wherein the food-conveying member includes a feeding-in conveyor for feeding food dough between the cluster of extending rollers and the food-conveying member, a part of the feeding-in conveyor being guided by a belt-guiding member that is inclined so that a downstream end of the feeding-in conveyor is lower than an upstream end thereof, said part of the feeding-in conveyor being opposed to the cluster of extending rollers.

3. The apparatus of claim 1 or 2, wherein the food-conveying member includes a feeding-out conveyor for receiving extended food dough and conveying downstream food dough that has been extended, a part of the feeding-out conveyor being guided by a belt-guiding member that is inclined so that a downstream end of the feeding-out conveyor is higher than an upstream end thereof, said part of the feeding-out conveyor being opposed to the cluster of extending rollers.

4. The apparatus of claim 1, wherein said food-conveying member includes a feeding-in conveyor to feed in food dough and a feeding-out conveyor to feed out extended food dough, belt-guiding members located to guide parts of the feeding-in and feeding-out conveyors so that the parts are inclined, said parts being opposed to the cluster of extending rollers, first and second conveying rollers located between the belt-guiding members so that the first and second conveying rollers are opposed to the cluster of extending rollers, wherein the distance between the first conveying roller and the cluster of extending rollers is less than that between the inclined part of the feeding-in conveyor and the cluster of extending rollers, the distance between the second conveying roller and the cluster of extending rollers is less than that between the first conveying roller and the cluster of extending rollers, and the distance between the inclined part of the feeding-out conveyor and the cluster of extending rollers is less than that between the second conveying roller and the cluster of extending rollers.

5. The apparatus of claim 1, wherein the box-shaped cover is pivotally mounted to the lower frame to permit the box-shaped cover and the cluster of the plurality of extending rollers located therein to be moved upwardly and away from the food-conveying member.

6. The apparatus of claim 5, wherein the box-shaped cover is pivotally mounted to the lower frame at a downstream part of the food-conveying member.

* * * * *